Nov. 26, 1968  W. McCANDLESS  3,412,654
APPARATUS FOR FORMING DRUM-LIKE CONTAINERS
Filed April 18, 1966  7 Sheets-Sheet 1

INVENTOR.
WILLIAM McCANDLESS
BY W. A. Schaich &
Thomas A. Meehan
ATTORNEYS

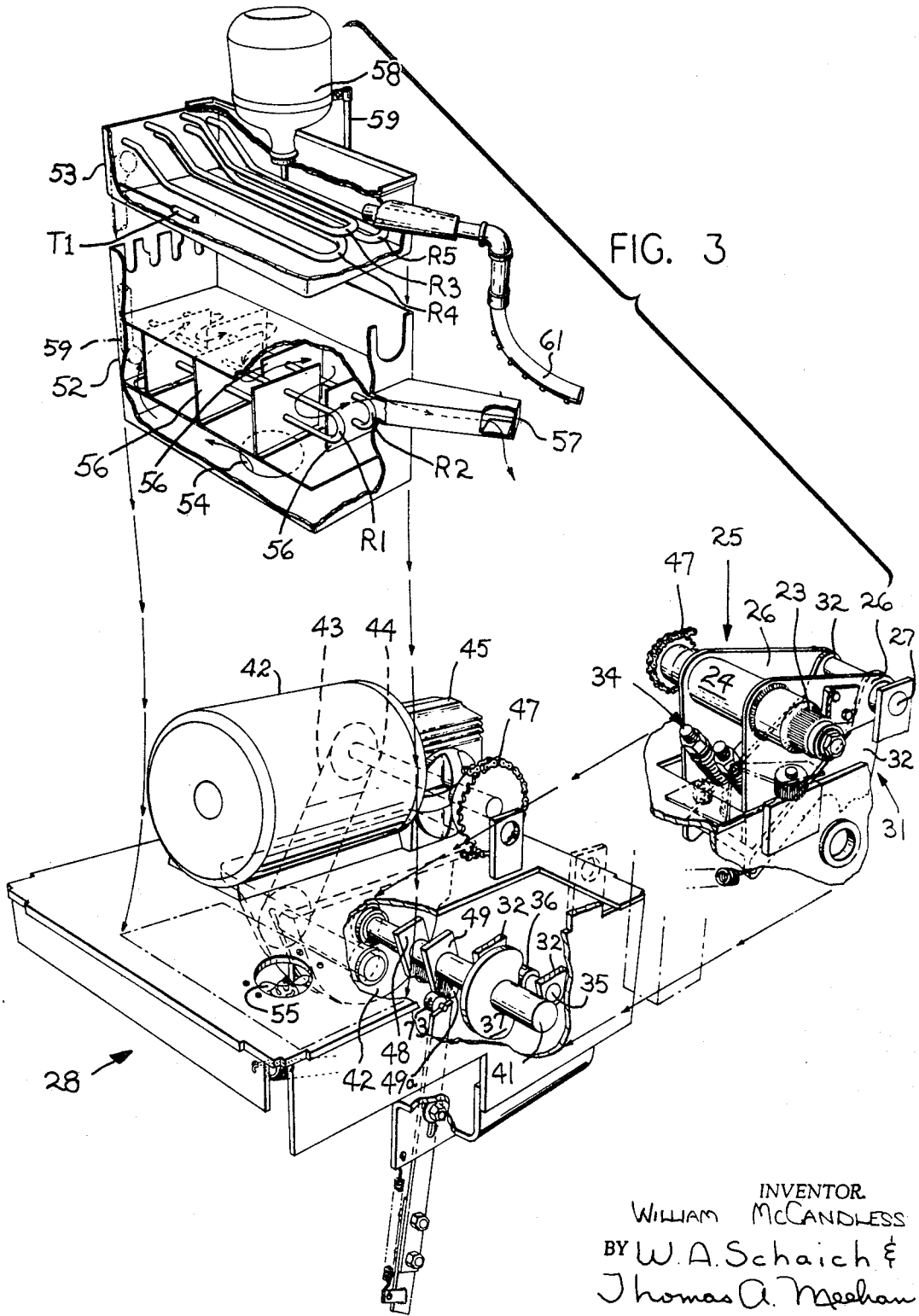

Nov. 26, 1968  W. McCANDLESS  3,412,654
APPARATUS FOR FORMING DRUM-LIKE CONTAINERS
Filed April 18, 1966  7 Sheets-Sheet 5

INVENTOR.
WILLIAM McCANDLESS
BY W. A. Schaich &
Thomas A. Meehan
ATTORNEYS

United States Patent Office 3,412,654
Patented Nov. 26, 1968

3,412,654
APPARATUS FOR FORMING DRUM-LIKE
CONTAINERS
William McCandless, Toledo, Ohio, assignor to
Owens-Illinois, Inc., a corporation of Ohio
Filed Apr. 18, 1966, Ser. No. 543,302
7 Claims. (Cl. 93—55.1)

ABSTRACT OF THE DISCLOSURE

This application discloses a machine for successively mechanically forming drum-like containers from fibreboard sleeves and end panels. Each container has a liquid tight end seam which is formed by adhesively bonding the outer circumferential rim of the circular end panel to the inside of the infolded marginal portion of the cylindrical sleeve. The end seam is enhanced by providing the infolded marginal portion with a circular series of radial undulations, and an elastically mounted serrated crimping wheel is provided at a forming station of the machine to form the undulations by compressing the infolded portion against a support mandrel. The adhesive bond between the infolded portion of the sleeve and the end panel is obtained by providing the marginal portions of the sleeves with a pre-applied heat and moisture-activatable adhesive and by providing means to direct streams of steam and warm air against the marginal portion of each sleeve as it approaches the bonding position. A machine according to this invention has three container-forming mandrels mounted equidistant from the center of a common rotating platform which is rotated in one-third rotation increments to successively position each mandrel at loading, forming and unloading stations. A vertically reciprocatable extractor device with a suction head is positioned adjacent the unloading station to mechanically remove a completed container from the mandrel when it is in the unloading position.

---

Figure 5:
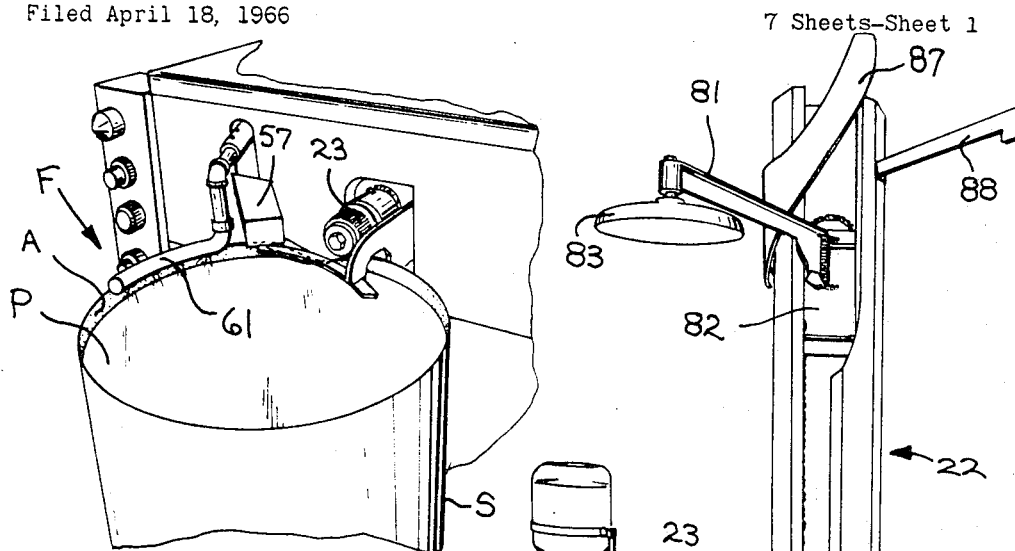

This invention relates generally to a machine for forming a generally cylindrically-shaped container. More particularly, the invention relates to a machine for forming, at high speed, drum-like containers of fibreboard elements, each container having a liquid tight end structure formed by a direct adhesive bond between an infolded marginal portion of a tubular sleeve of solid fibreboard or corrugated board and a circular fibreboard end panel. Containers of this type may be considered to be generally similar to containers of the type shown in U.S. Patent 3,133,686 (J. G. Rabby et al.), owned by the assignee of this application, which have found widespread acceptance in the packaging of asphalt. A machine for forming such containers may be considered to be an improvement of a machine of the type disclosed in U.S. Patent 3,133,-482 (J. E. Armstrong et al.), also owned by the assignee of this application.

U.S. Patent 3,133,482, previously referred to, discloses a machine for forming drum-like containers in which an inelastically mounted crimping head is used to apply sealing pressure to an inwardly turned marginal portion of a tubular fibreboard sleeve and an underlying circular panel sufficient to deform the marginal portion of the sleeve to form an annular series of radial undulations therein. The compressive force necessary to form such undulations approaches the strength limitations of the fibreboard components and it is desirable to make the magnitude of this force relatively independent of minor differences in the relative position between the crimping head and the fibreboard components from cycle to cycle. Accordingly, it is an object of the present invention to provide a machine for forming drum-like containers, generally of the type disclosed in U.S. Patent 3,133,482, in which the crimping head is directed against the infolded marginal portion of a tubular fibreboard sleeve by force applicating means which are resilient in nature.

For a further understanding of the objects, advantages and features of the present invention, attention is directed to the following portion of the specification, the drawing, and the appended claims.

Figure 1:
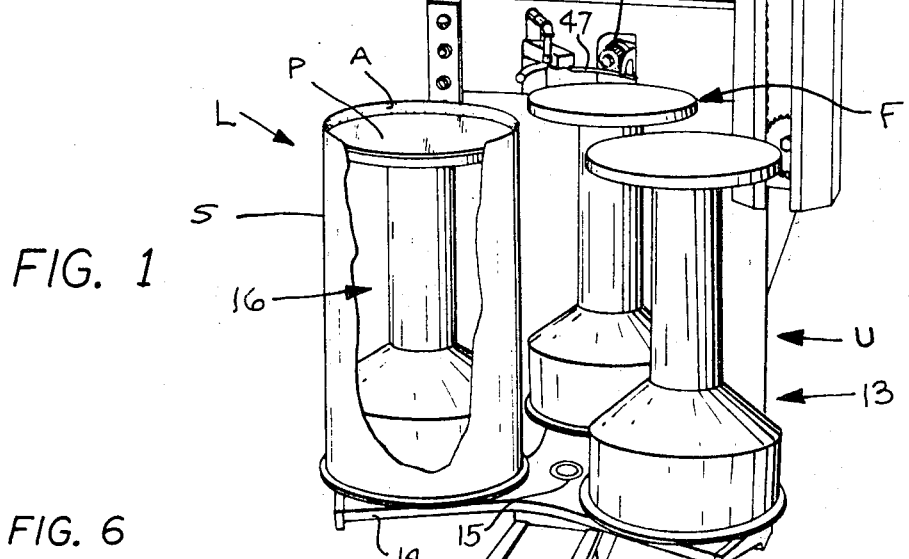
Figure 6:
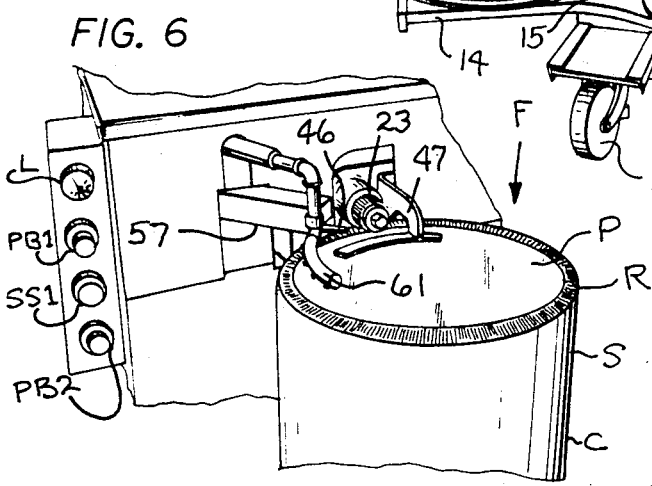
Figure 2:
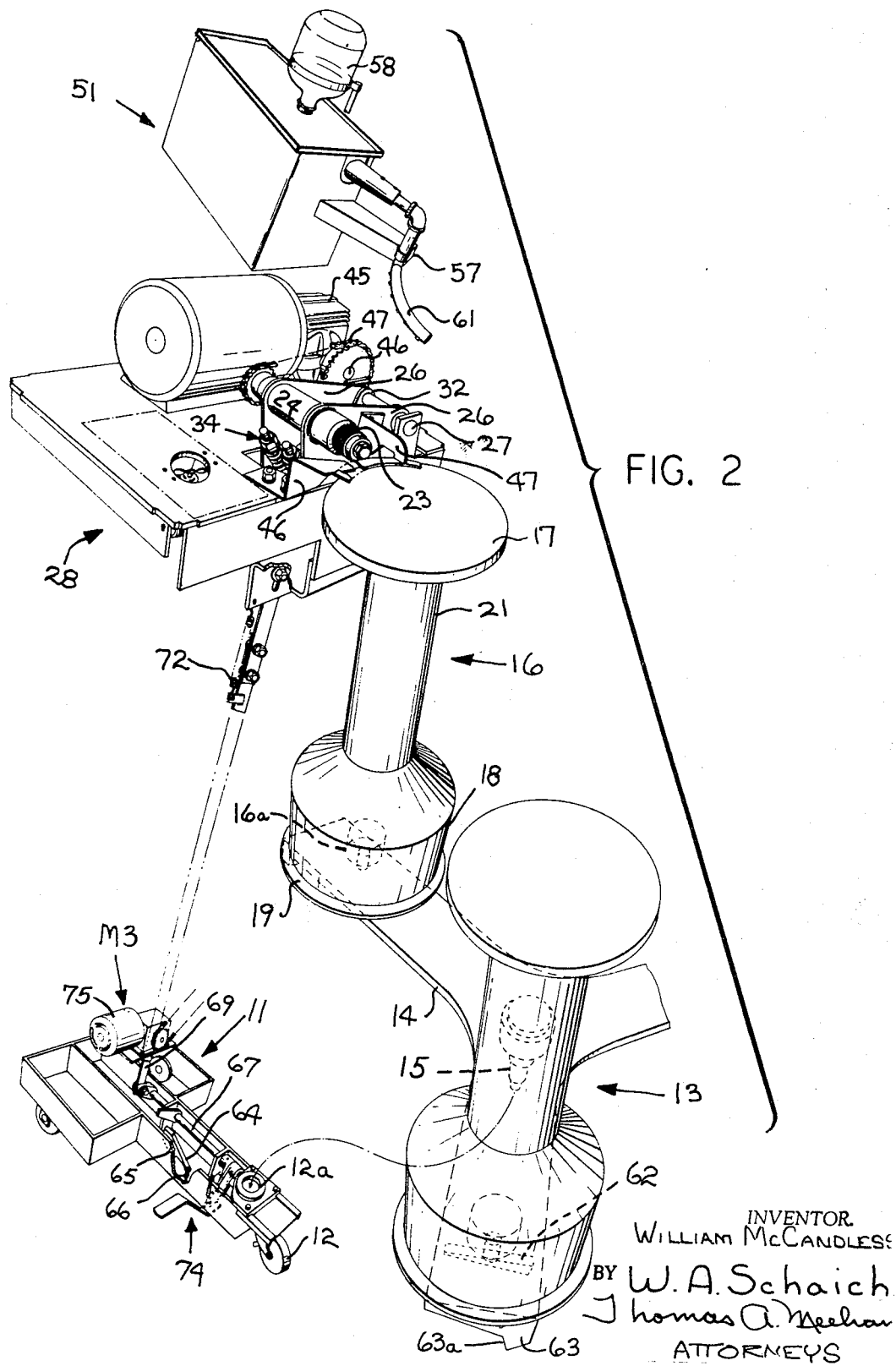
Figure 11:
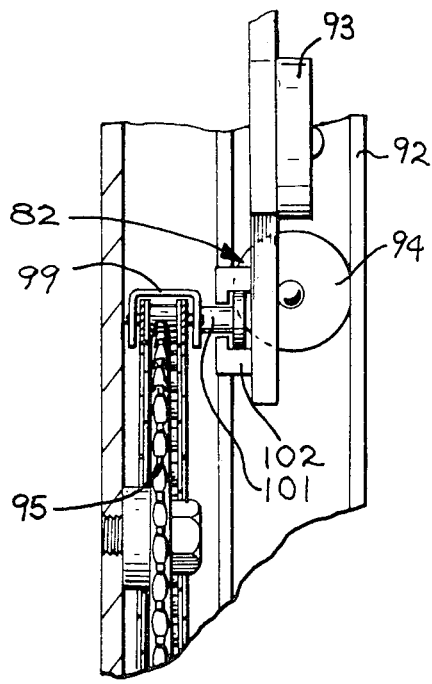
Figure 4:
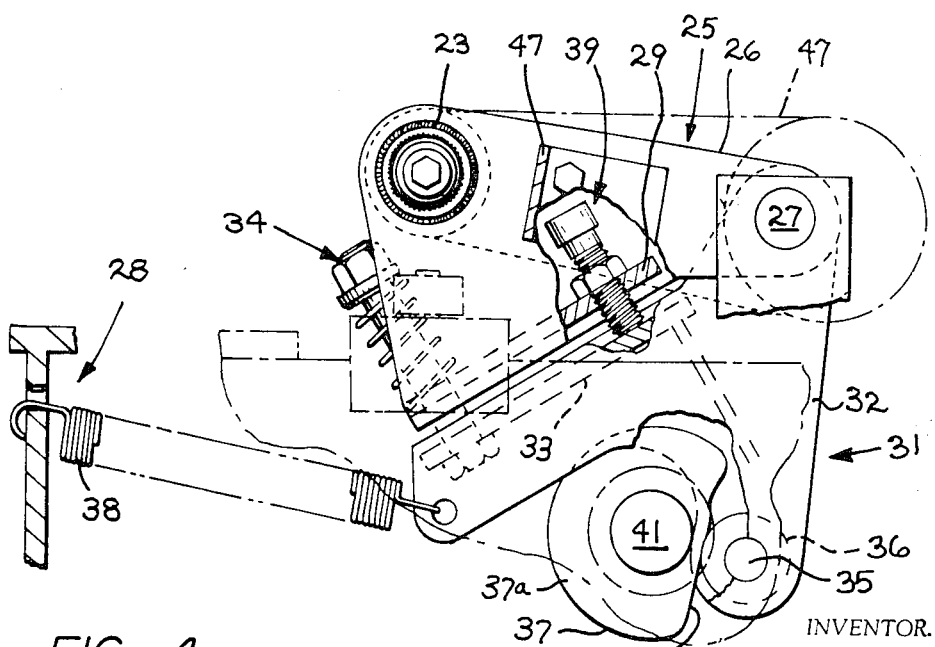
Figure 9:
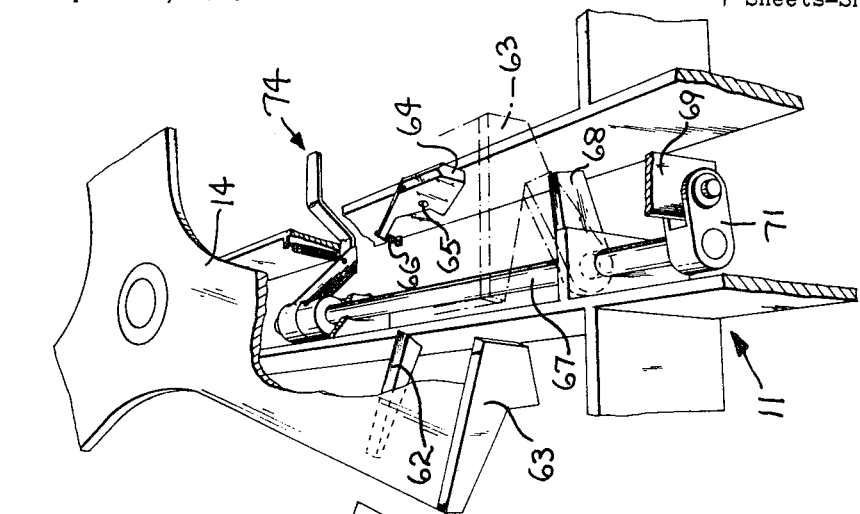
Figure 8:
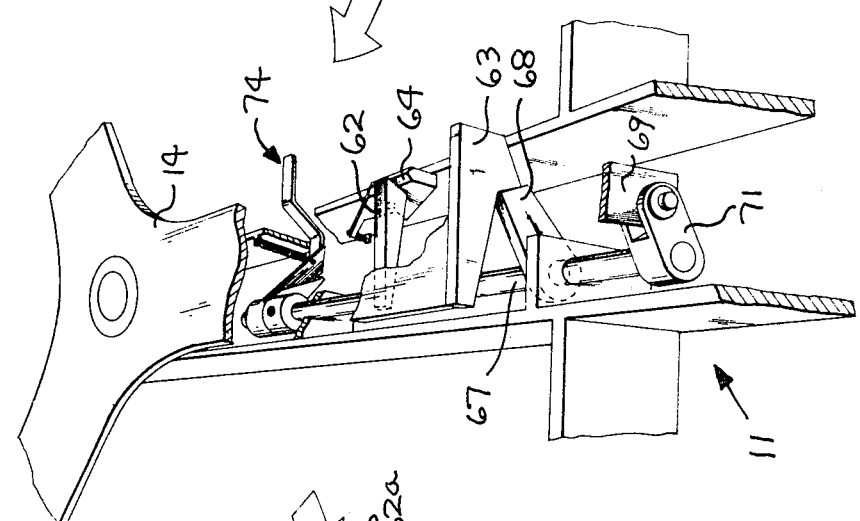
Figure 7:
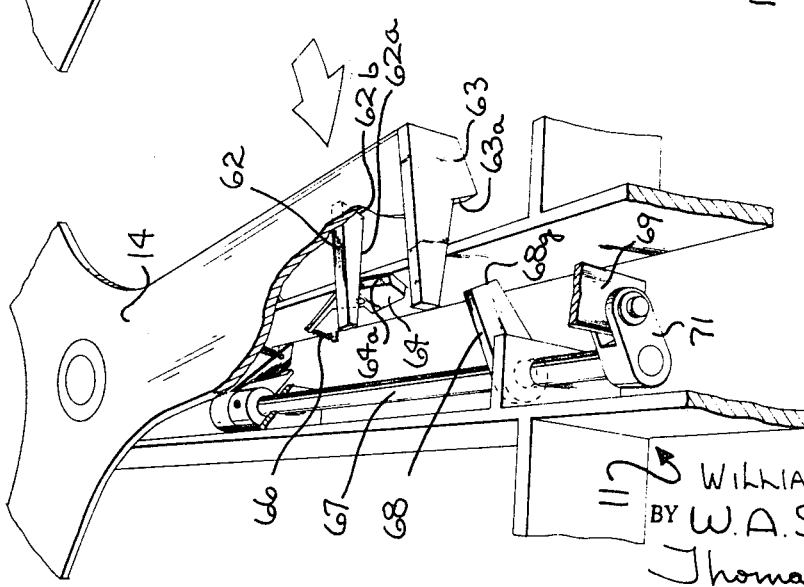
Figure 10:
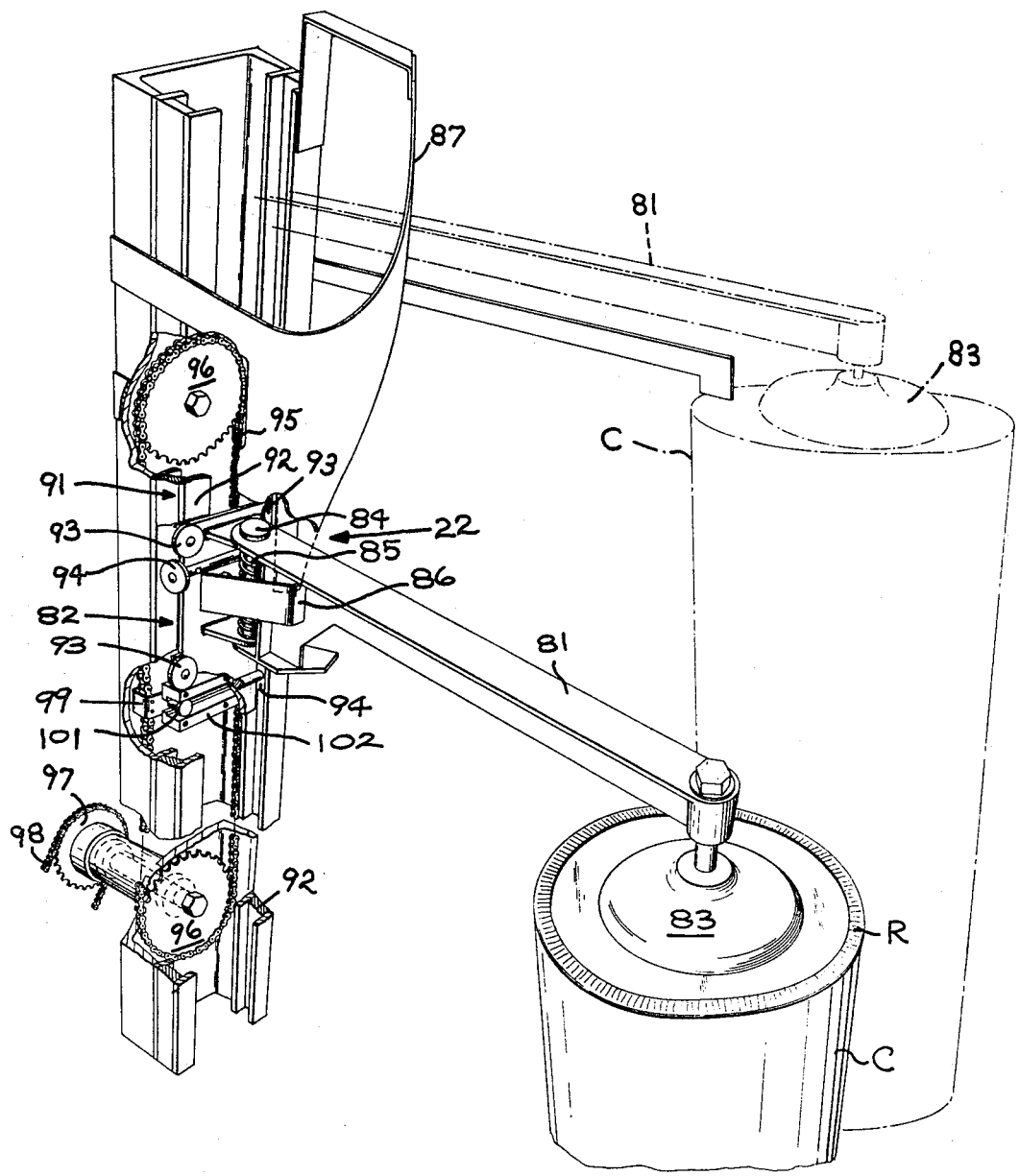
Figure 12:
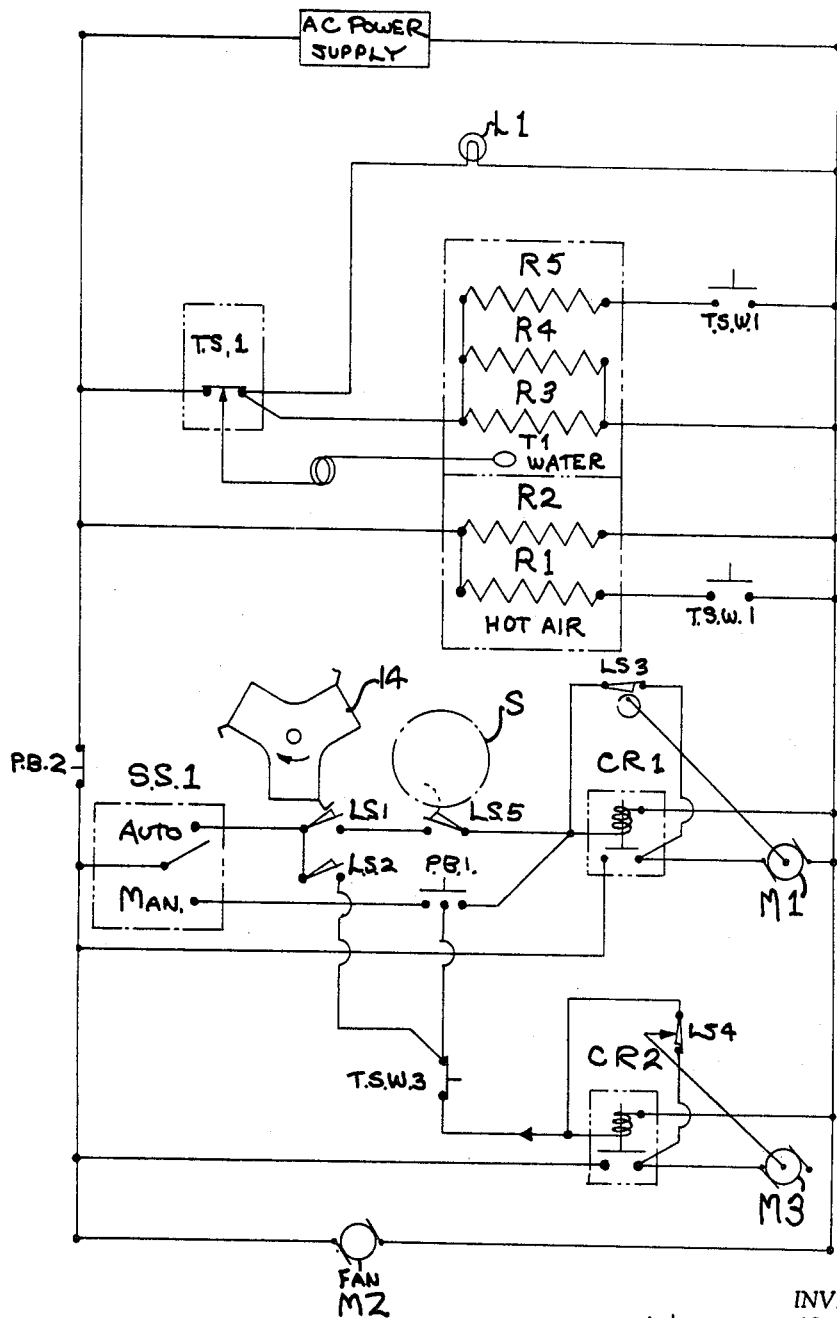

In the drawing:
FIG. 1 is a perspective view of container forming apparatus embodying the present invention;
FIG. 2 is an exploded view, in perspective, of the container forming apparatus of FIG. 1;
FIG. 3 is an exploded view, in perspective, of a portion of the apparatus of FIGS. 1 and 2 with parts of the structure being broken away for the sake of clarity;
FIG. 4 is an elevational view of a portion of the apparatus of FIG. 3;
FIG. 5 is a fragmentary perspective view showing the formation of the container at the start of the process thereof;
FIG. 6 is a view similar to FIG. 5 taken from a different location at the completion of the container forming process;
FIGS. 7–9 are perspective views of the mandrel platform latching mechanism of the apparatus of FIGS. 1 and 2, with parts of the structure being broken away for the sake of clarity, the views being taken at successive points in time of a latching cycle;
FIG. 10 is a perspective view of the container unloader mechanism of the apparatus of FIG. 1, with parts of the structure being broken away for the sake of clarity;
FIG. 11 is an elevational view of a portion of the mechanism of FIG. 10; and
FIG. 12 is a schematic wiring diagram showing the drive, motion control and other electrical components of the apparatus of FIG. 1.

GENERAL DESCRIPTION

As is shown in FIGS. 1, 5, 6 and 10, the apparatus of the present invention is used to assemble a drum-like container C, FIGS. 6 and 10, from a fibreboard sleeve S and a circular fibreboard end panel P. As is well known in the art, sleeve S may be formed from a double-ended sheet of fibreboard by joining the ends thereof to one another by gluing or stapling and taping. Container C may, for example, be used in the packaging and shipment of asphalt, which is poured at elevated temperature into such container. In such case the portions of the surfaces of sleeve S and panel P which contact such asphalt are desirably provided with a release coating (not shown), such as a silicone coating, to permit subsequent rapid and clean disengagement of the fibreboard elements from the solidified asphalt at the point of consumption of the asphalt. Assembly of sleeve S to panel P is accomplished, in the preferred and illustrated embodiment of the present invention, by providing an interior marginal portion of sleeve S with a heat and/or moisture activatable adhesive A, FIG. 5, by activating the adhesive by directing a stream or streams of activating fluid of suitable composition and temperature into contact therewith, for example, separate streams of heated air and wet steam, and by inwardly deforming such marginal portion of the sleeve to lie in engagement with the panel by means effective to compress the marginal portion tightly against the panel and to form an annular series of radial undulations in the inwardly deformed marginal portion of the sleeve.

As is shown in FIGS. 1 and 2, a machine for assembling a container from a sleeve S and a panel P comprises a base member, shown generally at 11, and desirably mounted on wheels 12 for portability. Mounted in base member 11 is a mandrel assembly, shown generally at 13, comprising a horizontally situated support member or platform 14 constructed in the form of a Y, each arm of which is spaced 120° from the other arms. Mandrel assembly 13 has a centrally situated downwardly extending spindle 15 (FIG. 2) which is journalled in a thrust bearing 12a of base member 12 to permit rotation of support member in a horizontal plane about a vertical axis through spindle 15.

Attached to each arm of mandrel platform 14, at locations equi-distant from the axis of spindle 15, is a vertically upstanding mandrel unit 16 which is journalled for free rotation about its vertical central axis in mandrel platform 14 by suitable spindle and thrust bearing assemblies 16a. Each mandrel unit comprises a top circular support plate 17 at the upper extremity thereof, and means forming a bottom member 18 of circular configuration, of a diameter not substantially less than the diameter of plate 17, and with an annular outwardly extending bottom support plate 19. A suitable columnar member 21 is also provided to transmit compressive force from top plate 17 to support member 14.

At a loading station of the apparatus of the present invention, designated by reference character L in FIG. 1, a fibreboard tubular sleeve S is formed to a generally circular configuration, usually manually from a flattened condition in which it was previously placed for convenience in shipping, and is telescoped over the mandrel unit 16 then at station L until the bottom edge of sleeve S rests upon bottom support plate 19. The spacing between the top of bottom support plate 19 and the top of top support plate 17 is such that the adhesive-coated marginal portion of sleeve S extends above the top of plate 17. Fibreboard panel P is also placed on plate 17 inside of such marginal portion of sleeve S at the same station.

After sleeve S and panel P are in place on the mandrel unit 16 at station L, the mandrel assembly 13 is rotated, in a manner hereinafter described, one-third of a complete revolution to advance such mandrel unit to the second of the three operation stations, designated by reference character F, see especially FIGS. 5 and 6. At station F the marginal portion of sleeve S is bonded to panel P in a manner hereinafter described more fully. In the meanwhile, another sleeve S and panel P may be brought into position on the mandrel unit 16 now at loading station L to await advancement to station F upon the next one-third revolution advancement of mandrel assembly 13. Upon such next one-third revolution advancement of mandrel assembly 13, the completed container C and the mandrel unit 16 on which it is located is advanced to the last of the three operating stations, designated by reference character U, where it is unloaded from such mandrel unit by mechanical unloading means, shown generally at 22, which are hereinafter described more fully. Upon the next one-third revolution advancement of mandrel assembly 13, the empty mandrel unit 16 at station U is returned to station L where an additional sleeve S and panel P are inserted thereon to be subsequently assembled into a container C. By means of such a three-station machine for forming drum-like containers, the formation of such containers may be effected at a high rate for long uninterrupted periods of time.

END SEAM FORMING MEANS

The means for forming a liquid-tight end seam between the marginal edge portion of sleeve S and the overlapped portion of underlying panel P on the top of top plate 17 of the mandrel unit 16 at station F comprises a power-driven serrated forming wheel 23. Forming wheel 23 bears heavily against an infold portion of the marginal edge of sleeve S, which is supported from its opposite side by top plate 17 of mandrel unit 16, at a point in time immediately after the adhesive coating A has activated by means hereinafter described more fully. The action of forming wheel 23 is effective to form radial undulations R, FIGS. 6 and 10, in the infolded marginal edge of sleeve S and the rotation of wheel 23 is continued for a duration sufficient to cause the mandrel unit 16 at station F to rotate one complete revolution on its vertical axis so that such radial undulations R will be arranged in an endless annular pattern. This results in a highly effective seal between sleeve S and panel P, as is disclosed in above-mentioned U.S. Patents 3,133,482 and 3,133,686.

Forming wheel 23 is mounted on a shaft 24 which is securely affixed to a frame 25 comprising spaced apart platular members 26. Members 26 are pivoted about a shaft 27 which extends parallel to shaft 24 and which is securely attached to a platform member, indicated generally at 28, which may be considered to be securely affixed to base member 11.

Also pivoted about shaft 27 is a second frame 31 comprising a pair of spaced-apart platular members 32 which are spanned by a transversely extending plate member 33 rigidly attached to plates 32. Members 26 are similarly spanned by a transversely extending plate member 29 (see FIG. 4) which lies generally parallel to member 33. Frame 25, which carries shaft 24 and forming wheel 23, is resiliently biased in a counterclockwise arc about shaft 27 toward frame 31 by means of one or more (shown as two) spring asemblies, designated generally at 34. Frame 31 further comprises a shaft 35 extending between plates 32, parallel to shaft 27, spaced from shaft 27 and from plate 33, and carrying a cam follower 36, and this unit is resiliently biased in a clockwise direction until the cam follower engages cam 37 by means of the action of spring 38, one end of which is secured to platform member 28. A controlled minimum spacing between plates 29 and 33 is adjustably maintained by means of an adjustment screw assembly, designated generally at 39 (FIG. 4).

Cam 37 is mounted on a shaft 41, parallel to shaft 27, which is driven at controlled speed by speed reducer 42. Gear reducer 42 is powered by a chain drive 43 from output shaft 44 of a double output shaft ratiomotor 45 (motor M1 of FIG. 9). The other output shaft 46 of ratio motor 45 drives shaft 24 and forming wheel 23 by means of chain drive 47.

Cam 37 is constructed with a radially extended portion 37a (FIG. 4), in the form of an arc of a circle, shown as being approximately 240° in length, and a portion 37b of reduced radius extending between the termini of portion 37a. Portion 37a is of such a radius that it urges the assemblage comprising frames 31 and 25 in a counterclockwise arc about shaft 27 to bring forming wheel 23 into a predetermined crimping position relative to the top plate 17 of a mandrel unit 16 at forming station F, i.e., a position which will form radial undulations R in the inturned marginal edge of sleeve S superimposed over a panel P. After rotation of cam 37a into the arc of portion 37b, the action of spring 38 will urge the assemblage of frames 31 and 25 in a clockwise direction in an arc about shaft 27 to lift crimping wheel 23 upwardly from its crimping position to thereupon permit mandrel assembly to be rotated another one-third revolution for its next cycle of operation. It is obvious, of course, that the lengths of arcs 37a and 37b of cam 37 must be correlated with the speeds of shafts 41 and 24 so that crimping wheel 23 is effective to rotate the mandrel unit 16 at station F at least one complete revolution, and preferably at least two complete revolutions, at a suitable seam forming rate as cam 37 rotates through the arc of position 37a and to allow mandrel unit to properly index one-third of a revolution as cam 37 rotates through the arc of portion 37b.

To assist in the sealing of the marginal portion of sleeve S to panel P there is provided a deflector shoe 46, securely mounted to platform member 28, which initially inwardly deflects such marginal portion at a location immediately in advance of its contact with crimping wheel 23. Additionally, frame 25 has affixed thereto a hold down shoe 47 which retains panel P in place on support plate 17 of mandrel unit 16 and which retracts with platform 25 at the end of the crimping cycle so that it will not interfere with the next indexing movement of mandrel platform 14.

END SEAM FORMING MEANS (ELECTRICAL)

Upon the completion of a single crimping operation and the retraction of forming wheel 23 to a non-crimping position, shut-off cam 48, mounted on shaft 41, is effective to depress a limit switch, shown only in FIG. 12 as LS3, which interrupts the supply of power to ratiomotor 45 (motor M1). At the same time another cam 49, also mounted on shaft 41, releases latching means which serve to lock mandrel platform 14 in position hereinafter described more fully. Thereupon mandrel platform 14 is manually indexed another one-third revolution to bring another unassembled sleeve S and panel P and the associated mandrel unit 16 to station F. At this time, if auto-manual selector switch SS1 is set for manual selection, the next crimping cycle will not begin until push button PB1 is manually depressed. Thereupon motor M1 (ratiomotor 45) will be energized and the next crimping cycle will be performed. If, however, selector switch SS1 is set for automatic selection, motor M1 will be automatically energized when mandrel platform has completed its one-third revolution indexing motion by virtue of contact of means carried by each arm of the platform (not shown) with a limit switch LS1. When switch LS1 closes, it energizes a relay CR1 which thereupon passes current to motor M1. Relay CR1 is of a type having its own holding circuit to keep motor M1 running until limit switch LS3 is opened. As a further refinement of the present invention, there is an additional limit switch LS5 which is closed by the presence of a sleeve S on the mandrel unit 16 at station F. If no sleeve is in place, switch LS5 will not close and no current will pass to relay CR1 even when switch LS1 closes.

ADHESIVE ACTIVATING SYSTEM

In effecting a bond between the inturned marginal portion of sleeve S and the portion of underlying panel P overlapped thereby, as has previously been mentioned, it is desirable to pre-apply an adhesive A to such marginal portion and to dry such adhesive well in advance of the assembly of the finished container C. An adhesive which has been found to be quite suitable for this purpose is a polyvinyl acetate resin emulsion adhesive marketed commercially by H. B. Fuller Company of Cincinnati, Ohio, under the designation 2045 and comprising, prior to drying, an aqueous emulsion of thermoplastic particles. Such an adhesive is most effectively activated at station F of the apparatus of the present invention by directing streams of warm air and steam thereover at a point in time just prior to the crimping operation. In such an activating process, the steam replaces the moisture that has been evaporated from the original adhesive to resolubilize the particles and the warm air increases the effectiveness of the adhesive in the resulting joint because it causes softening of the thermoplastic particles. The warm air also acts to dry excessive moisture which may be deposited by the steam and brings the adhesive to a suitably tacky condition before the crimping begins. Proper tackiness obtained in this manner in the operation of a container forming machine of the type disclosed herein is important because of the short duration of time of the bonding operation.

The adhesive activating fluids are generated by generator means, shown generally at 51, which is mounted on platform unit 28 of the machine of the present invention. Generator means 51 comprises a warm air generator 52 and a steam generator 53 mounted thereabove. Air is propelled into warm air generator 52 through port 54 in the bottom thereof by means of a fan 55 mounted on platform 28 and powered by motor M2 (FIG. 12). The air flows through generator 52 in a tortuous path defined by baffles 56 and is heated as it passes along such path by contact with resistance heating elements R1 and R2. Heated air from generator 52 is delivered into contact with adresive A of the sleeve S on the mandrel unit 16 at forming station F at a location a short distance in advance of crimping wheel 23 by a distributor nozzle 57. Temperature of the air passing from nozzle 57 may be controlled within acceptable limits by providing a manually operated toggle switch, TSW1, to control the flow of current through one of the heating elements, shown as element R1. A thermostatically controlled switch can be used in place of switch TSW1 if desired.

Steam is generated in generator 53 from water delivered thereto by gravity from a supply bottle 58. Water from bottle 58 forms a pool in the bottom of generator 53 where it is heated to its boiling point by means of resistance heating elements R3, R4 and R5 submerged therein. The steam generated in generator 53 is mixed with a controlled quantity of warm air from generator 52, which is bled thereinto by means of conduit 59 fluidly connecting the generating chambers, and the mixture is delivered therefrom to a multi-ported distributor outlet 61 for direction against the adhesive A of the adjacent portion of the sleeve S at forming station F. The admixture of warm air with steam in the manner described is beneficial in two ways; it increases the velocity of the steam exiting from distributor 61, which results in more uniform steam distribution through the various outlets, and it replaces the water consumed from the closed system comprising generator 53 and bottle 58 thereby preventing the pressure in such system from becoming sub-atmospheric. The quantity of steam generated in unit 53 can be controlled within acceptable limits by providing a manually operated toggle switch, TSW2, to control the flow of current through one of the heating elements in chamber 53, shown as element R5. Resistors R1–R5 are desirably sized so that switches TSW1 and TSW2 need only be closed when the machine is in an environment where the ambient conditions are cold and dry, respectively. As a safety precaution, a thermostatic switch TS1, responsive to a thermostatic bulb T1 submerged in unit 53, is provided to interrupt the flow of current through resistors R3–R5 when the temperature in unit 53 reaches some predetermined temperature above the boiling point of water, e.g., 250° F., indicative of depletion of the water supply from unit 53. A signal lamp L1 is provided in series with switch TS1 to provide visible notice of the opening of the switch.

MANDREL PLATFORM LATCHING MECHANISM

As is shown particularly in FIGS. 2 and 7–9 of the drawing, apparatus in accordance with the present invention is provided with latching mechanism which positively checks the rotational advance of mandrel platform 14 at such time when a mandrel unit is brought into proper container-forming position at station F, which positively prevents mandrel platform 14 from rotating rearwardly during the container-forming or crimping cycle, and which automatically releases or unlatches at the conclusion of the crimping cycle to permit platform 14 to be indexed another one-third revolution. Such mechanism comprises first and second cam plates 62 and 63 mounted on the underside of each arm of platform 14 and generally transversely of the radius of rotation thereof. The bottom of cam 62 has a forwardly-located and gradually downwardly inclined portion 62a and a rearwardly located and shaply upwardly inclined portion 62b. Cooperative with cam 62 is a latch plate 64 pivotally mounted to base member 11 at 65 and having a portion with a top surface 64a which is resiliently urged into interfering contact with the movement of cam plate 62 by the action of spring 66. Forward rotation of platform 14 causes portion 64a of latch plate to gradually depress against the action of spring 66 by virtue of the camming action of portion 62a of cam 62. As the rotation of platform 14 continues, cam 62 moves, relative to portion 64a, until portion 62b comes into contact therewith. Thereupon, spring 66 returns plate 64 to its normal position and, by its engagement with portion 62b of cam 62, it positively prevents platform 14 from rotating in reverse.

The mandrel platform latching mechanism further comprises a shaft 67 journalled for at least a limited degree of rotation in base member 11 at a location beneath the plane of rotation of platform 14 and its appended cam plates 62 and 63, and which is shown as extending generally parallel to the radius of rotation of the platform. Securely affixed to shaft 67 at a location in the path of rotation of cam 63 is an upwardly extending latching dog 68. Latching dog 68 is provided with a face 68a extending at a substantial angle to the horizontal. Face 63a engages a face 63a of cam 63 that extends parallel thereto at a location immediately after portion 62b of cam 62 has passed into locking relationship with surface 64a of latch plate 64. Consequently, platform is securely restrained in place during the crimping cycle, forward rotation being prevented by the engagement of face 63a of cam 63 with face 68a of latching dog 68 and rearward rotation being prevented by the engagement of face 62b of cam 62 with member 64.

Upon the conclusion of the crimping cycle shaft 67 is rotated a partial turn sufficient to rotate the top of dog 68 to a position lower than the lowermost portion of cam 63 (see FIG. 9). This rotation is activated by the downward movement of generally vertically extending trip arm 69, the bottom of which is pivotally mounted in fitting 71 which is secured to shaft 67. Trip arm 69 is resiliently urged to an upward position by the action of spring 72, one end of which is secured to platform 28, and is provided at its upward end with a cam follower wheel 73 (FIG. 3) to transmit downward movement thereto from lobe 49a of previously mentioned cam 49 at the end of the crimping cycle. At this time, mandrel platform 14 can be indexed forward another one-third revolution and in the illustrated and preferred embodiment of the present invention this indexing is accomplished manually. In the event of trouble during the crimping cycle, dog 68 can be selectively lowered to free mandrel platform 14, notwithstanding the position of lobe 49a of cam 49 relative to cam follower 73, by means of a foot pedal assembly indicated generally at 74.

UNLOADER MECHANISM (ELECTRICAL)

Unloader mechanism 22 is powered by a separate ratiomotor 75 (shown as M3 in FIG. 12) mounted on base member 11, as is shown in FIG. 2. The circuit to motor M3 is closed by means (not shown) carried by each arm of mandrel platform 14 which close limit switch LS2 as the mandrel platform 14 is rotated to bring a mandrel unit into container-forming position at station F. When limit switch LS2 closes, relay CR2 in the circuit of motor M3 is energized and motor M3 is thereafter started. Relay CR2 is of a type having its own holding circuit and motor M3 continues to operate until limit switch LS4 is opened at the end of the unload cycle, as is described more fully hereinafter. A toggle switch TSW3 is provided in the circuit of motor M3 to shut down the automatic operations of the unloader mechanism.

UNLOADER MECHANISM

As is shown in particular in FIGS. 10 and 11, unloader mechanism 22 comprises an elongate arm 81 extending horizontally from a vertically reciprocatable trolley, shown generally at 82, and having means adjacent the end thereof, shown as a rubber suction cup 83, for engaging a completed container C on a mandrel unit 16 at unloading station U and for lifting it from the mandrel unit. Arm 81 is pivotally mounted at trolley 82 for a limited degree rotation in a horizontal plane about vertically extending axle 84 and is normally maintained in position above a mandrel unit 16 at station U by the action of spring 85 which urges arm 81 against stop member 86 located at a preselected position. Located adjacent the top of unloader means is an inclined cam member 87 which rotationally urges arm 81 away from stop member 86 after the bottom edge of sleeve S of container C has cleared the top of plate 16 of a mandrel unit. At a location adjacent the top of the upward stroke of trolley 82, the completed container C is disengaged from means 83, as by contact with stationary knock-off bar 88, and it falls therefrom to a storage area, conveyor or the like (not shown). Arm 81 is thereafter reversely rotated upon lowering of trolley 82 by the action of spring 85 until it engages stop 86.

Trolley 82 reciprocates in a track 91 formed by vertically spaced apart channel-shaped members 92 whose openings face toward one another. Free movement of trolley 82 in track 91 is obtained by providing it with a first set of four rollers 93 at corners of a rectangular array and which are rotatable in a plane normal to the webs of members 92 and in engagement therewith, and by providing trolley 82 with a second set of four rollers 94 at corners of a rectangular array and which are rotatable in planes normal to the flanges of members 92 and in engagement therewith.

Movement of trolley 82 is actuated by roller chain 95 which is trained about vertically extending and vertically spaced-apart sprockets 96, the lower of which is mounted on a shaft having another sprocket 97 mounted thereon which receives power from ratiomotor means 75 by means of roller chain drive 98. Driving engagement between roller chain 95 and trolley 82 is obtained by means of an attachment 99 to chain having a pin 101 extending therefrom which is received in a horizontally extending recess of a slide member 102 attached to trolley 82. As trolley 82 reaches the top of its stroke, as is shown in FIG. 11, further advancement of chain 95 is effective to move pin 101 around sprocket 96 to the opposite side of slide 102. In this manner, it is possible to change the direction of movement of trolley 82 without changing the direction of movement of roller chain 95.

Limit switch LS4 is preferably positioned in a manner to be closed just before trolley 84 reaches the top of its vertical reciprocation. This will be effective to de-energize motor M3 and to hold trolley 82 and arm 81 in an elevated position. Inertia of the trolley and associated members will thereby carry the means contacting limit switch LS4 out of contact therewith before a complete stop is obtained. However, by the time LS4 is again closed, relay CR2 will have opened and motor M3 will not be re-energized until the next indexing movement of the mandrel assembly 13 when limit switch LS2 is again closed.

As a safety feature of the illustrated embodiment of the present invention, it is to be noted that there is provided a push button, PB2 (FIG. 12), which can be manually depressed in the event of trouble to instantaneously interrupt the supply of power to motors M1, M2 and M3 to shut down the mechanisms powered thereby.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:

1. Apparatus for forming a drum-like container from a tubular fibreboard sleeve and a circular fibreboard end panel, said apparatus comprising, in combination: a vertically extending mandrel unit for supporting the fibreboard sleeve in an opened and vertical position and having a horizontal top plate for supporting the end panel in a horizontal position within the opened sleeve and at a position spaced from an end of the sleeve by a marginal portion of the sleeve; means for supporting the mandrel unit for free rotation about the vertical central axis of the mandrel; a serrated crimping wheel rotatable in tangential engagement with the marginal portion of the sleeve when such marginal portion is infolded to overlie the circular end panel for effecting rotation of the mandrel unit, sleeve and end panel in unison and for forming a circular series of radial undulations in such infolded marginal portion; mounting means for mounting such crimping wheel to permit it to be retracted from the position of tangential engagement with the infolded portion to a second position spaced vertically above said position, said mounting means comprising a shaft to which said crimping wheel is affixed, a frame to which said shaft is affixed, a second shaft spaced from said shaft and extending parallel thereto about which said frame is rotatable, a second frame rotatable about said second shaft, force means elastically urging said frame is an arc about said second shaft to a predetermined location relative to said second frame, said arc being in the direction which will impart downward motion to the central axis of the crimping wheel, and second force means periodically and inelastically urging said second frame about said second shaft in a second arc of the same direction as said arc; and drive means for imparting rotation to said crimping wheel.

2. Apparatus according to claim 1 wherein said second force means comprises a cam affixed to a rotatable shaft which is spaced from and parallel to said shaft and said second shaft, said cam having an arcuate portion of greater and uniform radial extent and a second arcuate portion of lesser radial extent; wherein said second frame comprises a cam follower against which said cam rotates; and further comprising third force means elastically acting on said second frame to urge the cam follower against the cam; and second drive means for imparting rotation to said rotatable shaft.

3. Apparatus according to claim 2 wherein said first drive means comprises a first output shaft of a double output shaft speed reducer; and wherein the second drive means comprises a second output shaft of said reducer.

4. Apparatus according to claim 3 wherein said arcuate portion is of sufficient arcuate extent to keep the crimping wheel in contact with the infolded portion of the fibreboard sleeve for a sufficient number of revolutions of the crimping wheel to effect at least two complete revolutions of the mandrel unit about its central vertical axis.

5. Apparatus according to claim 3 wherein there is provided motor means to power said speed reducer; and further comprising means carried by said rotatable shaft for de-energizing said motor means after said cam has been rotated to bring the second arcuate portion into contact with said cam follower.

6. Apparatus according to claim 1 wherein said frame comprises a pair of plates spaced apart from one another and extending parallel to one another and transversely to said shaft, and a third plate attached to at least one of said pair of plates and extending at a substantial angle thereto; wherein said second frame comprises a pair of plates spaced apart from one another and extending parallel to the pair of plates of the first frame, and a third plate attached to at least one of said pair of plates, extending parallel to the third plate of said frame, and having a portion which overlaps a portion of the third plate of said frame; and further comprising adjustable means for maintaining an adjustable minimum distance between the overlapping portions of the third plates of said frame and said second frame.

7. Apparatus according to claim 6 wherein each of third plates of said frame and said second frame is secured to both of the pair of plates of the respective frame and extends therebetween; and wherein the pair of plates of one of said frame and second frame elements is located inside of the pair of plates of the other of said frame and second frame elements.

References Cited

UNITED STATES PATENTS 2,216,331 10/1940 Swallow _____ 93—39.1 X
3,133,482  5/1964 Armstrong _____ 93—55.1

WAYNE A. MORSE, JR., *Primary Examiner.*